(12) United States Patent
Canaia (10) Patent No.: US 11,103,812 B2
(45) Date of Patent: Aug. 31, 2021

(54) FILTER FOR PLASTIC MATERIAL

(71) Applicant: FIMIC srl, Carmignano di Brenta (IT)

(72) Inventor: Erica Canaia, Carmignano di Brenta (IT)

(*) Notice: Subject to any disclaimer, the term of this patent is extended or adjusted under 35 U.S.C. 154(b) by 185 days.

(21) Appl. No.: 15/143,527

(22) Filed: Apr. 30, 2016

(65) Prior Publication Data

US 2016/0317953 A1 Nov. 3, 2016

(30) Foreign Application Priority Data

Apr. 30, 2015 (IT) .......................... UB2015A000321

(51) Int. Cl.
| | |
|---|---|
| *B01D 29/05* | (2006.01) |
| *B29C 48/27* | (2019.01) |
| *B29C 48/693* | (2019.01) |
| *B29C 48/25* | (2019.01) |
| *B01D 29/58* | (2006.01) |
| *B01D 29/64* | (2006.01) |
| *B29B 17/02* | (2006.01) |
| *B29C 48/92* | (2019.01) |

(52) U.S. Cl.
CPC ............ *B01D 29/05* (2013.01); *B01D 29/58* (2013.01); *B01D 29/6476* (2013.01); *B29B 17/02* (2013.01); *B29C 48/2545* (2019.02); *B29C 48/2735* (2019.02); *B29C 48/693* (2019.02); *B29B 2017/0217* (2013.01); *B29C 48/92* (2019.02); *B29C 2948/92019* (2019.02)

(58) Field of Classification Search
None
See application file for complete search history.

(56) References Cited

U.S. PATENT DOCUMENTS

| | | | | |
|---|---|---|---|---|
| 683,386 A | * | 9/1901 | Corlett ................... | B01D 29/33 210/355 |
| 925,040 A | * | 6/1909 | Sennott ................ | B01D 29/118 209/358 |
| 1,585,817 A | * | 5/1926 | Jackson ................. | B01D 33/15 210/411 |
| 1,891,396 A | * | 12/1932 | Prutzman ........... | B01D 25/1645 210/219 |
| 1,956,720 A | * | 5/1934 | Gordon ............... | B29C 48/2735 241/82.3 |
| 2,089,702 A | * | 8/1937 | Lomax ..................... | A23B 5/00 210/408 |
| 2,107,040 A | * | 2/1938 | Lomax ..................... | A23B 5/00 210/773 |
| 2,236,769 A | * | 4/1941 | Armbruster ........ | B01D 21/0009 210/360.1 |
| 2,480,119 A | * | 8/1949 | Cram ...................... | D21D 5/02 209/273 |

(Continued)

FOREIGN PATENT DOCUMENTS

| | | |
|---|---|---|
| CN | 103692636 A | 4/2014 |
| CN | 204136398 U | 2/2015 |

(Continued)

*Primary Examiner* — Robert J Popovics
(74) *Attorney, Agent, or Firm* — Quick Patents; Kevin Prince (57) ABSTRACT

What is presented is a filter for plastic material, in particular a device that filters recycled plastic material, to clean it of extraneous bodies and foreign elements by means of several filtration units within a single body.

1 Claim, 4 Drawing Sheets

(56) References Cited

U.S. PATENT DOCUMENTS

| | | | | |
|---|---|---|---|---|
| 2,682,811 A * | 7/1954 | Infanger | B01D 25/38 | 209/250 |
| 2,728,943 A * | 1/1956 | Hertz | B29C 48/03 | 425/190 |
| 3,146,494 A * | 9/1964 | Sponaugle | B29C 48/69 | 425/199 |
| 3,197,533 A * | 7/1965 | Robinson | D01D 1/065 | 264/169 |
| 3,214,019 A * | 10/1965 | Griffin, III | E21B 21/06 | 137/99 |
| 3,243,849 A * | 4/1966 | Jonkainen | B29C 48/691 | 210/340 |
| 3,361,263 A * | 1/1968 | Street | B01D 33/801 | 210/332 |
| 3,393,262 A * | 7/1968 | Durso | B01D 29/23 | 264/188 |
| 3,455,357 A * | 7/1969 | Zink | B29C 48/694 | 425/153 |
| 3,503,096 A * | 3/1970 | Marianelli | H01L 29/00 | 210/341 |
| 3,637,191 A * | 1/1972 | Abraham | B22C 5/0468 | 366/1 |
| 3,640,395 A * | 2/1972 | Kinney | B01D 29/58 | 210/334 |
| 3,767,056 A * | 10/1973 | Neuman | B29C 45/24 | 210/409 |
| 3,817,377 A * | 6/1974 | Piggott | B01D 29/902 | 210/767 |
| 3,856,680 A * | 12/1974 | Elmore | B29C 48/6912 | 210/184 |
| 3,940,335 A * | 2/1976 | Kalman | B01D 29/096 | 210/780 |
| 4,010,391 A * | 3/1977 | Kalman | B01D 29/096 | 210/774 |
| 4,057,379 A * | 11/1977 | Sato | C11D 13/10 | 425/199 |
| 4,076,681 A * | 2/1978 | Boehme | B01F 1/0016 | 209/316 |
| 4,080,297 A * | 3/1978 | Yoshida | B01D 29/09 | 210/387 |
| 4,162,975 A * | 7/1979 | Adams | B01D 29/46 | 210/124 |
| 4,167,384 A * | 9/1979 | Shirato | B29C 48/6912 | 425/183 |
| 4,177,234 A * | 12/1979 | Lowry | B29C 48/2735 | 264/140 |
| 4,202,659 A * | 5/1980 | Kinoshita | B29C 48/691 | 425/183 |
| 4,280,907 A * | 7/1981 | Haberle | B01D 29/115 | 210/408 |
| 4,299,707 A * | 11/1981 | Neuman | B29C 48/2735 | 210/791 |
| 4,430,214 A * | 2/1984 | Baker | E04H 4/1209 | 210/167.12 |
| 4,470,904 A * | 9/1984 | Gail | B01D 29/111 | 210/103 |
| 4,511,472 A * | 4/1985 | Trott | B29C 48/691 | 210/340 |
| 4,657,636 A * | 4/1987 | Satomi | B01D 29/036 | 162/261 |
| 4,701,118 A * | 10/1987 | Koching | B29C 48/6912 | 425/185 |
| 4,752,386 A * | 6/1988 | Schulz | B01D 29/01 | 210/108 |
| 4,755,290 A * | 7/1988 | Neuman | B01D 29/055 | 210/138 |
| 4,849,113 A * | 7/1989 | Hills | B01D 29/09 | 210/741 |
| 4,888,110 A * | 12/1989 | Fogarty, Jr. | B01D 29/76 | 210/106 |
| 4,921,607 A * | 5/1990 | Langley | B01D 29/114 | 210/266 |
| 5,004,414 A * | 4/1991 | Stude | B29C 48/6912 | 425/185 |
| 5,061,170 A * | 10/1991 | Allen | B29C 48/37 | 425/197 |
| 5,078,275 A * | 1/1992 | Chupka | B07B 1/06 | 209/273 |
| 5,090,887 A * | 2/1992 | Gneuss | B01D 29/01 | 425/185 |
| 5,122,286 A * | 6/1992 | Kreyenborg | B01D 29/668 | 210/791 |
| 5,125,823 A * | 6/1992 | Kreyenborg | B01D 29/66 | 425/185 |
| 5,141,631 A * | 8/1992 | Whitman | B01D 29/05 | 210/108 |
| 5,200,077 A * | 4/1993 | McNeice | B01D 29/15 | 210/323.2 |
| 5,462,653 A * | 10/1995 | Hills | B01D 29/114 | 210/85 |
| 5,482,216 A * | 1/1996 | Hess | B29C 48/385 | 241/23 |
| 5,484,539 A * | 1/1996 | Tersi | B01D 29/114 | 210/774 |
| 5,510,030 A * | 4/1996 | Bacher | B01D 33/073 | 210/397 |
| 5,567,463 A * | 10/1996 | Schaaf | A23P 30/20 | 426/523 |
| 5,578,207 A * | 11/1996 | Kreyenborg | B29C 48/273 | 210/323.2 |
| 5,618,423 A * | 4/1997 | Lin | B01D 33/073 | 210/360.2 |
| 5,643,450 A * | 7/1997 | Bacher | B01D 29/036 | 210/350 |
| 5,658,459 A * | 8/1997 | Guttormsen | B01D 24/14 | 210/279 |
| 5,688,402 A * | 11/1997 | Green | B01D 29/036 | 210/355 |
| 5,916,443 A * | 6/1999 | Mueller | B01D 29/41 | 210/346 |
| 5,928,523 A * | 7/1999 | Hobrecht | B29C 48/691 | 210/767 |
| 5,958,255 A * | 9/1999 | Hobrecht | B29C 48/2725 | 210/790 |
| 6,117,338 A * | 9/2000 | Hoagland | B01D 35/12 | 210/767 |
| 6,149,807 A * | 11/2000 | Previero | B01D 29/096 | 210/236 |
| 6,153,093 A * | 11/2000 | Bentivoglio | B29C 48/2554 | 210/108 |
| 6,216,880 B1 * | 4/2001 | Previero | B01D 29/096 | 210/359 |
| 6,227,380 B1 * | 5/2001 | Bacher | B01D 29/036 | 210/408 |
| 6,270,703 B1 * | 8/2001 | Wildman | B01D 29/33 | 264/39 |
| 6,290,483 B1 * | 9/2001 | McIsaac | B29C 48/05 | 425/192 R |
| 6,308,704 B1 * | 10/2001 | Wennerberg | B01F 5/247 | 128/203.15 |
| 6,325,922 B1 * | 12/2001 | Schaller | B01D 29/05 | 210/90 |
| 6,375,013 B1 * | 4/2002 | Gail | B01D 29/09 | 210/391 |
| 6,378,705 B1 * | 4/2002 | Bacher | B01D 29/01 | 210/397 |
| 6,461,507 B1 * | 10/2002 | Ishigaki | B01D 29/055 | 210/111 |
| 6,485,770 B2 * | 11/2002 | McIsaac | B29C 48/345 | 426/512 |
| 7,124,895 B2 * | 10/2006 | Ettlinger | B01D 33/073 | 210/396 |
| 7,473,375 B2 * | 1/2009 | Stoerzer | B01D 29/01 | 210/406 |
| 7,824,544 B2 * | 11/2010 | Ettlinger | B29C 48/92 | 210/90 |
| 8,057,685 B2 * | 11/2011 | Laing | B01D 29/6476 | 210/744 |

(56) References Cited

U.S. PATENT DOCUMENTS

| | | | | |
|---|---|---|---|---|
| 8,596,858 | B2 * | 12/2013 | Ohashi | B01F 13/1016 366/171.1 |
| 9,561,454 | B2 * | 2/2017 | Browning | B01D 29/035 |
| 9,815,006 | B2 * | 11/2017 | Ettlinger | B01D 33/06 |
| 10,173,152 | B2 * | 1/2019 | Arbeithuber | B29C 48/692 |
| 10,807,295 | B2 * | 10/2020 | Kastner | B29C 48/2735 |
| 2001/0038874 | A1 * | 11/2001 | McIsaac | A23P 30/20 426/516 |
| 2005/0161391 | A1 * | 7/2005 | Ettlinger | B29C 48/2735 210/396 |
| 2006/0219645 | A1 * | 10/2006 | Bilanin | B01D 29/01 210/791 |
| 2007/0068867 | A1 * | 3/2007 | Ettlinger | B01D 33/073 210/396 |
| 2009/0053114 | A1 * | 2/2009 | Kampf | B01J 19/1887 422/135 |
| 2009/0308818 | A1 * | 12/2009 | Laing | B01D 29/6476 210/744 |
| 2010/0006492 | A1 * | 1/2010 | Schulz | B29C 48/70 210/225 |
| 2013/0277289 | A1 * | 10/2013 | Ettlinger | B29C 48/2735 210/116 |
| 2014/0224749 | A1 * | 8/2014 | Hopkins | B29C 47/0888 210/791 |
| 2015/0048016 | A1 * | 2/2015 | Hartmann | B29B 13/10 210/232 |
| 2016/0288026 | A1 * | 10/2016 | Arbeithuber | B29C 48/694 |
| 2016/0297133 | A1 * | 10/2016 | Arbeithuber | B29C 48/694 |
| 2016/0317953 | A1 * | 11/2016 | Canaia | B29C 47/081 |
| 2018/0008911 | A1 * | 1/2018 | Middler | B01D 24/38 |
| 2018/0065288 | A1 * | 3/2018 | Kastner | B29C 48/692 |
| 2018/0104625 | A1 * | 4/2018 | Kastner | B01D 33/0183 |

FOREIGN PATENT DOCUMENTS

| | | | |
|---|---|---|---|
| CN | 204235866 U | 4/2015 | |
| DE | 4325514 C1 | 10/1994 | |
| DE | 102015226348 A1 * | 6/2017 | B29C 48/691 |
| DE | 202019102066 U1 * | 5/2019 | B29B 17/02 |
| EP | 0689918 A1 | 1/1996 | |
| EP | 2764976 A2 * | 8/2014 | B01D 29/6469 |
| EP | 2764976 A3 * | 3/2015 | B29C 48/69 |
| EP | 3088157 A2 * | 11/2016 | B29C 48/2735 |
| EP | 3088157 A3 * | 11/2016 | B29C 48/2545 |
| FR | 3080046 A3 * | 10/2019 | B29C 48/2735 |
| FR | 3080046 B3 * | 5/2020 | B29C 48/695 |
| GB | 759079 A * | 10/1956 | B29C 48/2735 |
| GB | 1494032 A * | 12/1977 | B29C 48/694 |
| WO | WO-2005063357 A1 * | 7/2005 | B29C 48/2735 |
| WO | WO-2008031127 A1 * | 3/2008 | B29C 48/55 |
| WO | WO-2013110800 A1 * | 8/2013 | B01D 29/66 |
| WO | WO-2016131071 A2 * | 8/2016 | B29C 48/503 |
| WO | WO-2016131072 A2 * | 8/2016 | B29C 48/503 |
| WO | WO-2016131071 A3 * | 12/2016 | B29C 48/503 |
| WO | WO-2016131072 A3 * | 12/2016 | B29C 48/503 |

* cited by examiner

FILTER FOR PLASTIC MATERIAL

CROSS-REFERENCE TO RELATED APPLICATIONS

This application claims the benefit of Italian Patent Application IT UB2015/0321, filed on Apr. 30, 2015, and incorporated herein by reference.

STATEMENT REGARDING FEDERALLY SPONSORED RESEARCH AND DEVELOPMENT

Not Applicable.

FIELD OF THE INVENTION

The object of this invention relates to a filter for plastic material, in particular a device that filters plastic recycling material to clean it of foreign bodies and elements.

DISCUSSION OF RELATED ART

The technique is well known whereby the plastic material to be cleaned is heated to the point of melting to become a fluid so that it can be pushed under pressure inside a cleaning machine equipped with a filter for retaining all the solid parts, which are bodies and elements that are extraneous to the plastic material.

However at present the degree of purity required is always higher. Therefore there is a trend in the cleaning procedure towards subjecting the plastic material to a double filtration, the first for removing coarser material and a second for finer materials.

This procedure with two filtration steps can be carried out in two distinct ways.

A first possibility is to employ two separate machines for cleaning, each equipped with its own extruder with an internal filter with holes for the passage of the molten material each having different diameter holes, with the first machine able to remove the coarser elements and the second able to attain the desired quality.

According to the above-described method, the molten material, after the first filtration, is allowed to cool until it solidifies, then the mass is again cut into granules, and these are inserted into the second extruder and brought to the melting temperature before the second and last filtering.

A second possibility is to avoid the cooling after the first filtering and to treat the material that comes out from the first cleaning machine while it is still hot.

This second possibility is used to prevent the plastic material undergoing a further thermal shock, due to the cooling and subsequent heating until it melts.

Therefore the material, which has already undergone a first filtering, is not cooled and then brought back to the molten state before a second filtering, but from the outlet of the machine for the first cleaning, keeping it heated for the whole procedure in the molten state, it enters, via a specific pump, or with a second extruder, the inlet of a second cleaning machine for a second and finer filtering.

However, the pressures and the length of the entire path, the first machine-pump-second machine, are so high that they greatly deteriorate the plastic material.

Currently, therefore, a choice of employing a double machine for cascade filtering with an interposed pump, or second extruder, is only possible if the deterioration of the physical characteristics is compatible with the future use of the filtered plastic material obtained by such a process.

We should keep in mind also that the use of two machines, besides being very expensive, presupposes substantial costs for the replacement of the filters, which are generally changed, even if this is not indispensable, simultaneously on both machines.

In fact, since there is no storage or flywheel between the two machines, each stopping of the first or of the second machine necessarily involves the stopping of both; therefore, to minimize both the loss of material and to shorten the production downtime, it is preferable, either in a programmed manner or when it first becomes necessary, to replace both filters on both cleaning machines.

It is therefore clear that whatever filtration method is followed, with two passes, or in a single and continuous sequence on two machines, the costs to achieve optimal quality with minimum residue is costly especially in terms of time, of the financial costs for spare parts and the poorer performance characteristics of the material obtained.

SUMMARY OF THE INVENTION

The object of this invention is therefore that of overcoming the drawbacks of the prior art.

A particular object of this invention is to make available a filter for plastic material which provides excellent filtration in a short time.

A further object of this invention is to make available a filter that requires a low initial investment.

A different object of this invention is to make available a filter for plastic material that keeps acceptable the physical characteristics of the material obtained.

An important object of this invention is to make available a filter for plastic material that can easily be maintained.

An important object of this invention is to make available a filter for plastic material which produces less waste.

Another object of this invention is to make available a filter that increases the time between maintenance operations.

An obvious object of the present invention is to make available a filter for plastic material that is small.

A further object is to obtain higher quality for a material that due to excessive costs could not be filtered twice but only once, with a final quality that is unsuitable for numerous applications.

EXPLANATION OF THE INVENTION

All the aforesaid objects are attained with the filter for plastic material which is the object of the invention as specified in the attached claims.

In particular this is a filter for plastic material composed of a hollow body within which are housed the filtration devices and on which are made to rotate scrapers, via a drive shaft operated externally, where said hollow body has at least one inlet opening upstream of the filtration devices for the molten material that has to be filtered to enter, and at least one outlet opening downstream of the filtration devices for the exit of the filtered molten material, characterized by the fact that said filtration devices are at least two arranged in series, in such a way that the material filtered from the first filtration device encounters the inlet of the second filtration device and where the scrapers of both the first filtration device and the second filtration device are rotated by the same drive shaft.

Advantageous Features of the Invention

Advantageously, each of said filtration devices is composed of a perforated disc or plate solidly attached to the hollow body on whose front surface, in the direction of the flow of the molten material, rests a sheet of perforated metal, with a diameter of the holes, for the passage of the molten material, differing from each other on at least two filter elements, so that the larger foreign particles stop at the first filtration device.

Advantageously, the drive shaft rotates the scrapers after at least a variation in the pressure of the molten material along its path within the filter, which can be the exceeding of at least a fixed pressure value of the molten material, measured either in the inlet chamber or in the chamber between the first and second filter element, preventing undesired pressures from being reached as a result of the obstruction of at least one filter.

Advantageously, the drive shaft can be set in rotation on command independently of the pressure reached by the molten material, continuously or according to a sequence or time intervals or as a result of anticipated events.

Advantageously there is provision for at least one unloading channel for removing the dirty material which crosses said drive shaft; in fact the unloading of particularly dirty material, which blocks the holes of the filter and which is lifted from this position by the scrapers, when being moved, is collected toward the central axis, forced through at least one channel, and crosses the core of the drive shaft, and is finally released to the outside.

Advantageously, said drive shaft is in the center, and hollow for at least one section, where said cavity is a discharge conduit for removing the dirty material lifted by a filtration device using a scraper from the inside of the hollow body to the outside of the filter for plastic material.

Conveniently, the shaft cavity connects to a first radial window, through which said dirty material enters flowing through the cavity of said shaft.

Conveniently, the cavity of the shaft is joined with a second radial window, through which said dirty material comes out flowing through the cavity of said shaft, to the outside of the filtration device.

Advantageously, said scraper blades are supported by a scraper holder which is configured for the entire, or most of, the extension of these scraper blades, with a collection channel open along the support side of said blades, in this way being able, during the movement of these blades, to be made to rotate by the drive shaft, said channels conveying the dirty material towards the discharge pipe.

Advantageously, at least one discharge channel crosses the hollow body in the back and has a through-window or one communicating with the outside for the exit of the dirty material, where said window is outside the hollow body.

Advantageously at least a second discharge channel runs through the front wall that encloses the hollow body, in order to convey the dirty material to the outside.

Conveniently, said first and said second channels are not connected to each other.

Each of said channels is fitted with a suitable valve for the opening and closing said channels allowing or otherwise the release of the dirty material collected along the channel of the blade holders, when lifted by the scraper blades set in motion by the drive shaft.

The pressure for the exit of the dirty material through the discharge channels is provided directly by the entrance of the material to be filtered.

These and still other objects are all achieved by the filter for plastic material, in accordance with the attached claims.

DESCRIPTION OF THE DRAWINGS

The technical characteristics of the invention, according to the aforesaid aims, can be seen clearly in the content of the claims reported below, and its advantages will become more readily apparent in the detailed description that follows, made with reference to the accompanying drawings, which illustrate a preferred embodiment that is purely exemplary and not limiting, where:

DETAILED DESCRIPTION OF THE PREFERRED EMBODIMENT

Figure 1:
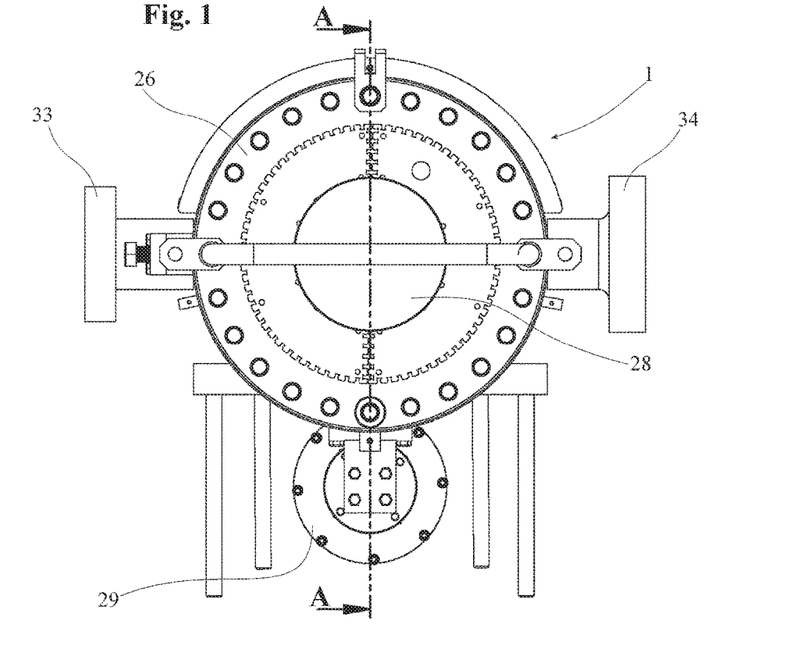
FIG. 1 shows a front view of the filter for plastic material that is the object of the invention.
Figure 2:
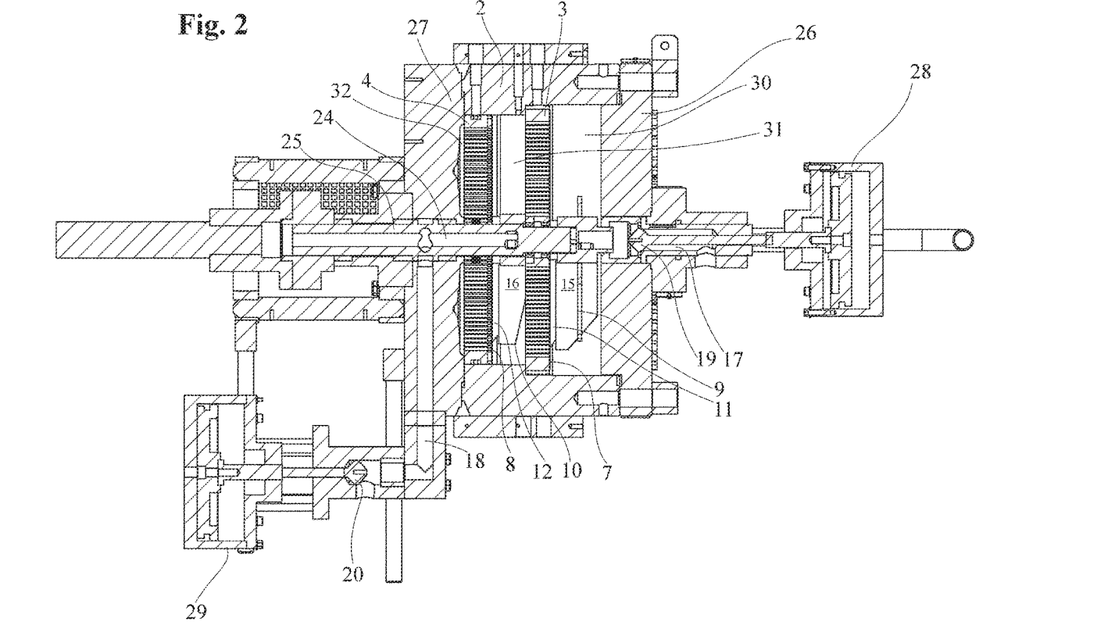
FIG. 2 shows the cross-section of the object of FIG. 1 along the section line AA.
Figure 3:
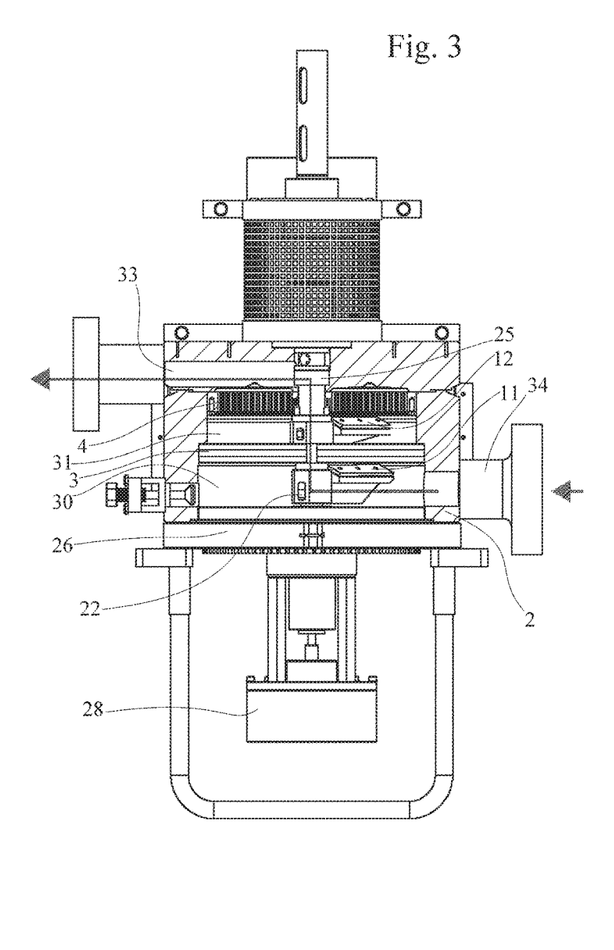
FIG. 3 shows a top view of the device with the hollow body in section.
Figure 4:
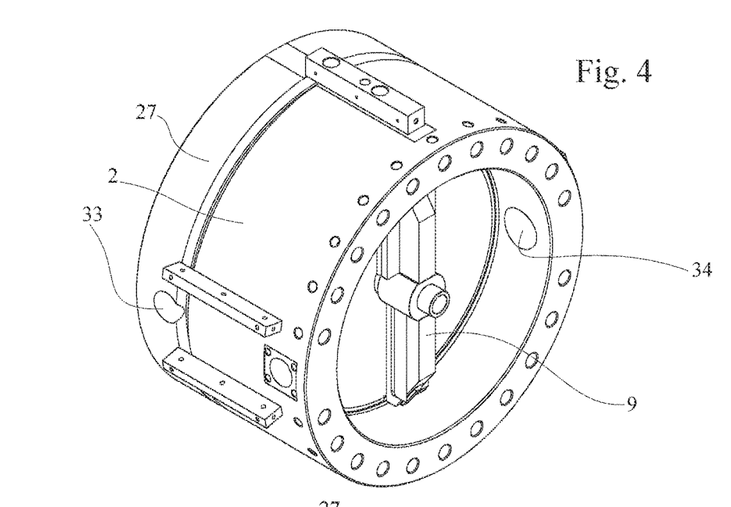
FIG. 4 shows a perspective view of the hollow body according without a front cover, revealing the first filtering device and its scraper.
Figure 5:
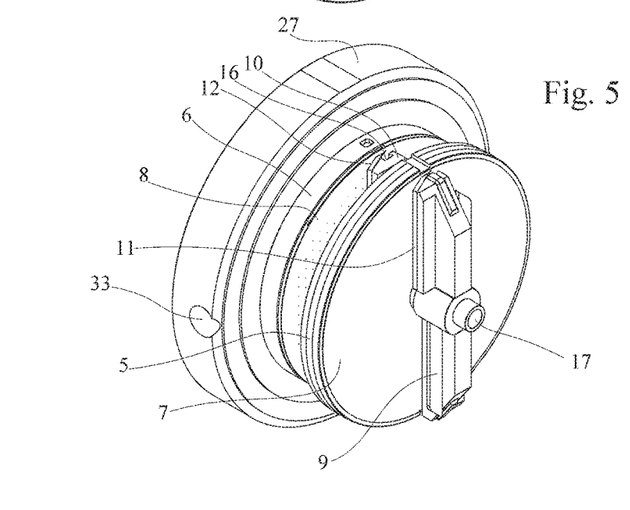
FIG. 5 shows what is set out in FIG. 4, with the hollow body removed, to highlight the presence of two the filtration devices and relative scrapers.
Figure 6:
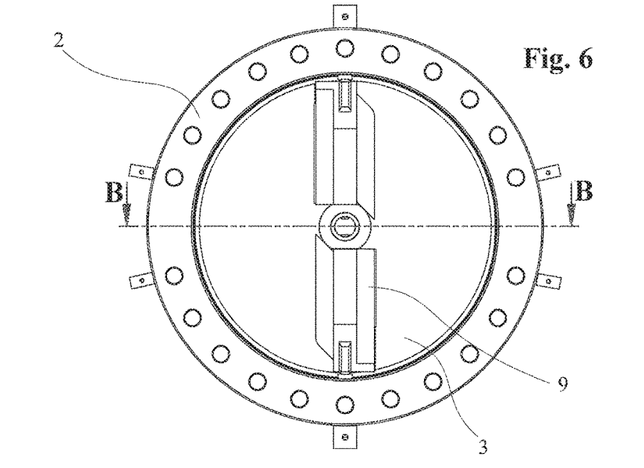
FIG. 6 shows what is set out above in FIG. 4 from a front plan view.
Figure 7:
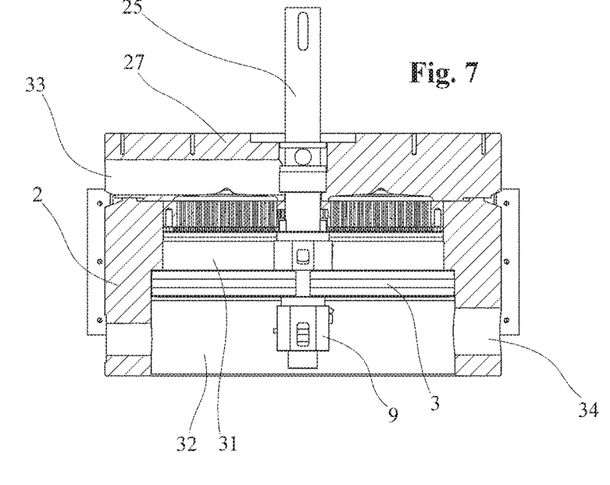
FIG. 7 shows the object of FIG. 6 sectioned along the section line B-B.
Figure 8:
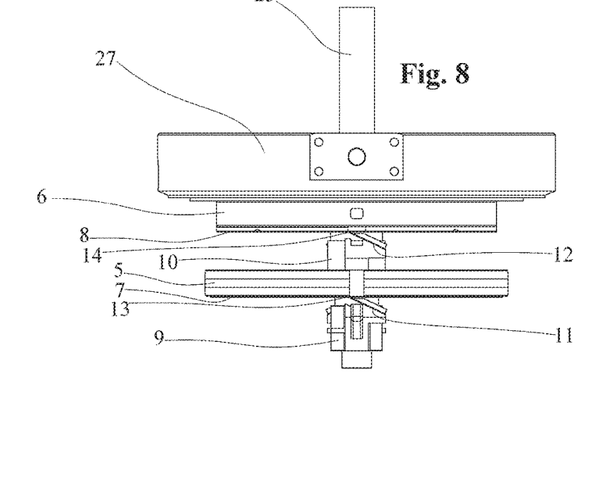
FIG. 8 shows a top view of the object of FIG. 5.
Figure 9:
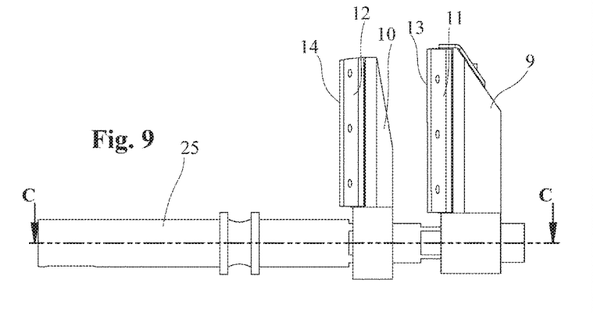
FIGS. 9, 10 and 11 respectively show two different side views and a sectional view along the section line C-C of the drive shaft with the two scrapers fitted.
Figure 10:
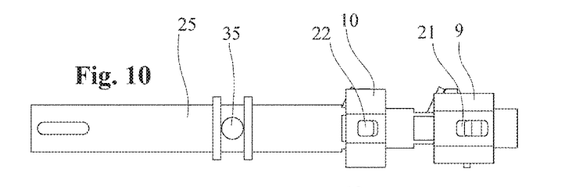
Figure 11:
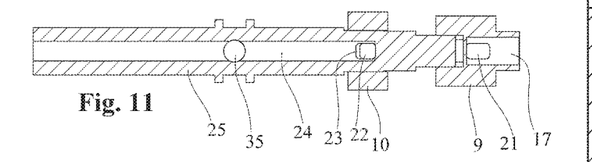
Figures 12, 13:
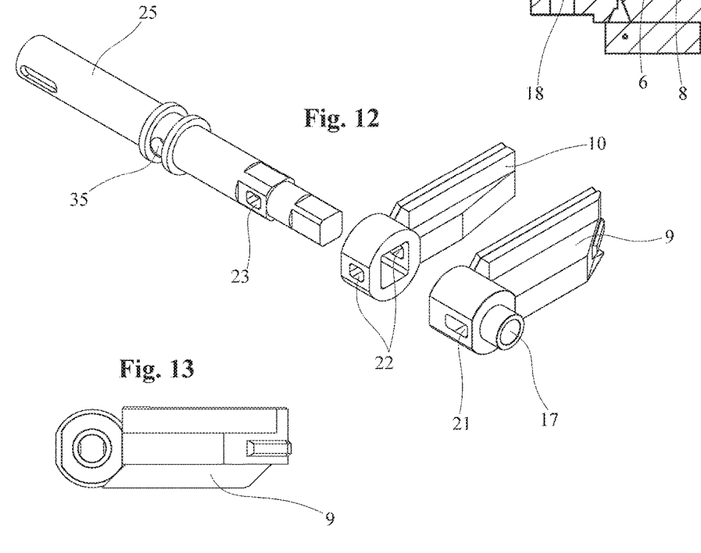
FIG. 12 shows a second exploded perspective view of the drive shaft and the two scrapers.
FIG. 13 shows only a front plan view of one scraper.
Figure 14:
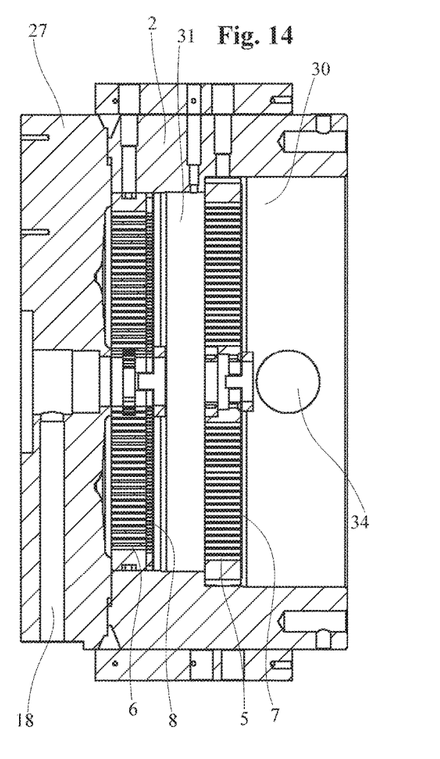
FIG. 14 shows a section along a vertical plane passing through the main axis of the hollow body, fitted with the filtration devices arranged in series, each provided with its own ring with key.

With reference to the figures, the filtration device 1 is basically composed of a hollow body 2 within which are housed a first filtration device 3 and a second filtration device 4.

Said first and said second filtration devices 3, 4, are arranged in sequence with a different filtration quality, so that the first filtering device 3, positioned upstream of the second filtration device 4 retains the largest pieces of dirt that in the molten plastic material, while the filtration device 4, which is downstream, retains the smallest dirt particles in the molten plastic material to be filtered.

Each of said filter devices 3 and 4 is composed of a perforated disc 5, 6, with an appropriately sized support to withstand the mechanical stresses, having a basically circular cross-section and that rests in a suitable housing within the hollow body 2.

Said perforated disc 5, 6 is likely to be a very thick perforated plate, which remains fixed with respect to the hollow body 2 when operating.

Overlying and resting on a base of each of these perforated discs 5, 6, there is a perforated sheet 7, 8 with suitably sized holes. Said perforated sheet 7, 8, which does not possess the characteristics for being able to withstand the considerable work pressures within the hollow body 2, and for this reason rests on the perforated disc 5, 6 dedicated to it, has the purpose of stopping all the dirt whose size exceeds the dimensions of the holes themselves.

On each of these perforated sheets 7, 8 a significant amount of material accumulates during the filtration that gradually clog the various holes and reduces the amount of molten material can be effectively be filtered.

For this reason there is, on each perforated sheet 7, 8, a scraper 9, 10, suitably spaced apart by a ring with a key, which includes a scraper 11, 12 whose scraping edge 13, 14 is placed in contact with the perforated sheet 7, 8, and is made to rotate by a drive shaft 25. Said scraper 9, 10 lifts and removes the dirty material that is clogging the filtration holes of each perforated sheet 7, 8.

Each perforated sheet 7, 8, whose scraping edge 13, 14 is in sliding contact on said perforated sheet 7, 8 and retained by an overhanging radial support 25 connected solidly to the drive shaft 25. Advantageously, each scraper 9, 10 is composed of a pair of scraper sheets 11, 12 and their supports arranged in a diametrically opposite manner.

This radial support has, for the entire or a large part of its longitudinal extension, in addition to the fastening of the scraping sheet 11, 12 and all within its body, a collecting channel 15, 16 for the dirty material that when lifted by the scraping blade 11, 12, and touching it, is collected, channeled within the collection channel 15, 16.

There is a window 21, 22 in the center of the connection hub of the support of the scrapers 9, 10 with the drive shaft 25, in connection with and continuing the collection channel 15, 16, to allow the transfer and the escape of said dirty material, through the hole of said windows 21, 22, to the outside of the hollow body 2.

Preferably the outflow of the dirt collected by the first filtration device 3 occurs through the front cover 26 of the hollow body 2, while the outflow of the dirt collected by the second filtration device 4 occurs on the bottom 27 of the hollow body 2, through the central cavity 24 of the drive shaft 25.

In fact, said drive shaft 25 is hollow in the center and has an opening 23 at the second window 22 relative to the collecting channel 16 of the radial support; while the first window 21 for the release of dirty material is connected to its own pipe 17 discharging towards the outside of the hollow body 2.

Clearly, these discharge pipes 17, 18 for the release of the dirty material are closed by valves 19, 20 controlled in their opening and closing according to predetermined events, for example timed or after the pressure rises or some other event previously anticipated. It is conceivable, with particularly dirty material, that there is also a continuous rotation of the scrapers (3, 4 . . . .

Said valves 19, 20 are moved by actuators 28, 29 located outside the hollow body 2 in order to facilitate their maintenance.

The operation of the filtration device 1 consists of a continuous flow of material entering through an inlet opening 34 of the hollow body 2 upstream of the first filtration device 3, into the first chamber 30 between the opening cover 26 and the first perforated sheet 7.

The molten material passes through the first filtering device 3, where the larger dirt particles are retained, to then pass through the holes of the corresponding first perforated support disc 5 of the first perforated sheet 7, within the second chamber 31, defined and included between the rear part of the first perforated disc 5 and the second perforated filtration sheet 8 of the second filtration device 4.

Because of the pressure of the incoming molten material, this molten material, in the second chamber 31, is forced to move through the second perforated sheet 8, which prevents the passage of the finer impurities, and subsequently, through the holes of the second perforated disc 6, reaching a final collector 32 to the rear of the second perforated disc 6, connected with an outlet opening 33, which runs through the hollow body 2 to the outside.

Even if there is a cleaning operation with lifting of the dirt by means of a scraper 9, 10 that partially clogs the relative holes, the input of the molten material through the inlet opening 34 of the hollow body 2 remains unchanged, or with a reduced flow.

This input of the material provides sufficient pressure because the dirty material, lifted by the relative scraper blades 11, 12, which move together, being fitted onto the same drive shaft 25, scraping in a rotary manner the respective perforated sheets 7, 8, can, following the relative channels 15, 16, be channeled towards the outlet, according to the various outlet pipes 17, 18 for the release of the dirt on the outside of the filter for plastic material 1.

Indeed, the exit of the dirty product will only happen if the respective valve 19, 20 is operated by the respective actuator 28, 29, to open and leave the outlet conduit free.

It is evident that this actuator and respective valves can also be different from one another, for example pneumatic or hydraulic or with a different structure, such as a screw feeder.

If, during the movement of the scrapers 9, 10, one of the two valves 19, 20 is kept closed, clearly the dirty product will not come out, but it will be accumulated and kept within the respective channel 15, 16 of the support of the scraper 9, 10

The maintenance of the filtration device 1 is equally simple.

Just open the opening cover 26, on the front of the hollow body 2, extract the first scraper 9 that holds one or two scraper blades 11; after that the perforated plate 7 and its perforated disc 5 can be removed.

After removing the first scraper 9 and the first filtering device 3, you can access the second scraper 10 and the second filtration device 4, to eventually remove the various parts for maintenance and/or cleaning.

What is claimed is:

1. A filter for plastic melt material comprising:
   a hollow body defining an internal cavity;
   a first filtration device sealingly spanning said internal cavity and defining a first chamber upstream of said first filtration device;
   a second filtration device sealingly spanning said internal cavity downstream of said first filtration device and defining a second chamber between said first filtration device and said second filtration device;
   an inlet for introducing molten plastic material into said first chamber;
   an at least partially hollow, externally actuated drive shaft extending through said first and second filtration devices;
   a first scraper fixedly mounted on said at least partially hollow, externally actuated drive shaft such that it rotates and scrapingly engages a filtration surface of said first filtration device when said drive shaft rotates;
   a second scraper fixedly mounted on said at least partially hollow, externally actuated drive shaft such that it rotates and scrapingly engages a filtration surface of said second filtration device when said drive shaft rotates;

a filtered melt outlet downstream of said second filtration device;

a first fluid path extending through said at least partially hollow, externally actuated drive shaft in fluid communication with said first chamber for allowing egress of debris accumulated on said first filtration surface;

a second fluid path extending through said at least partially hollow, externally actuated drive shaft in fluid communication with said second chamber for allowing egress of debris accumulated on said second filtration surface; and valving for controlling fluid flows such that filtration and debris removal may be separately accomplished;

wherein molten plastic introduced into said first chamber passes through said first filtration device, said second filtration device and exits through said filtered melt outlet, while debris contained in said introduced molten plastic is captured by said first and second filtration devices, and is subsequently removed by said first and second scrapers, and said removed debris exits through said first and second fluid paths.

\* \* \* \* \*